June 29, 1948.  E. BRIGGS ET AL  2,444,332
WING FOLDING ARRANGEMENT FOR SUBMERSIBLE AIRCRAFT
Filed Dec. 7, 1944  5 Sheets-Sheet 1
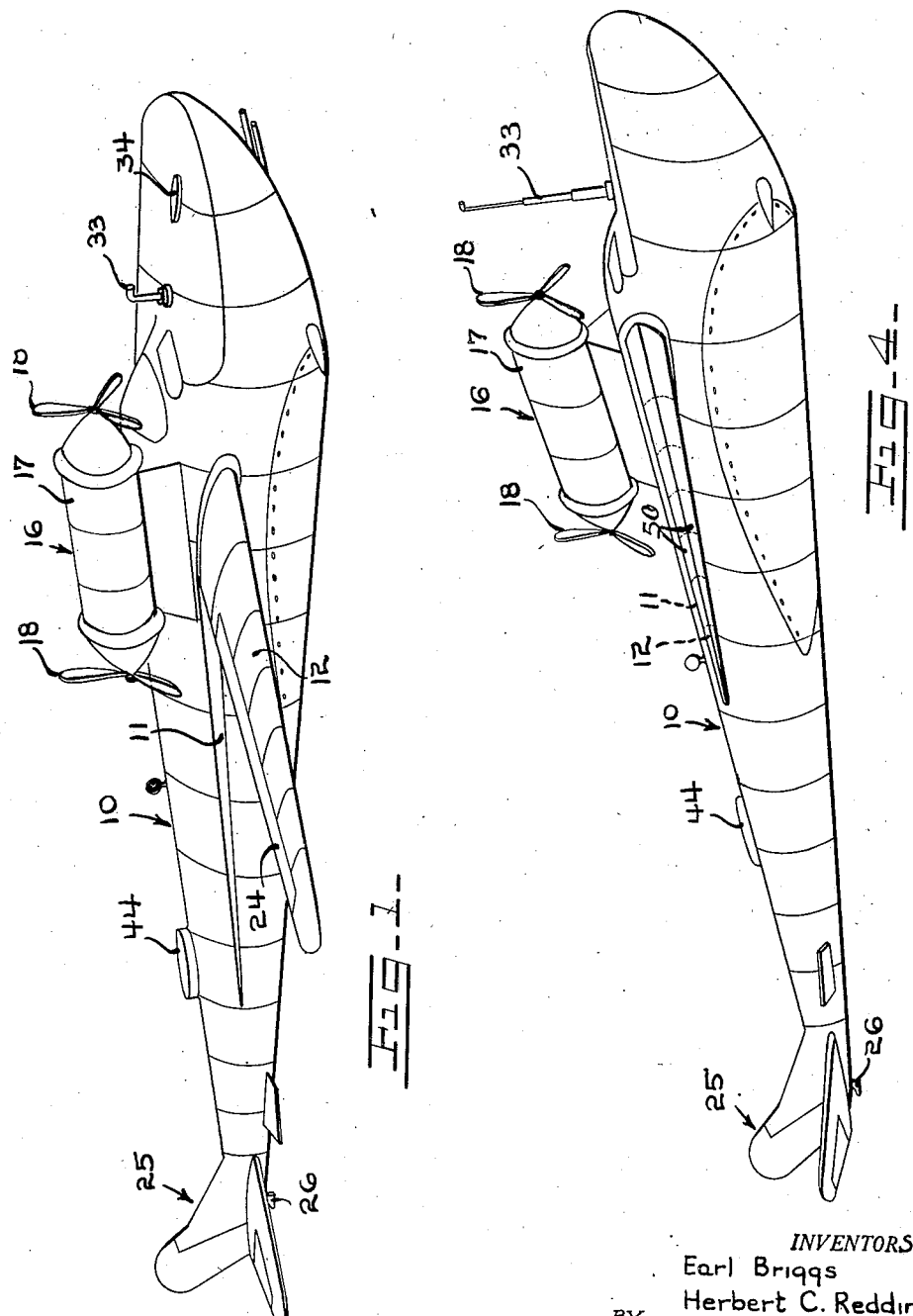
INVENTORS
Earl Briggs
Herbert C. Redding
BY
ATTORNEY.

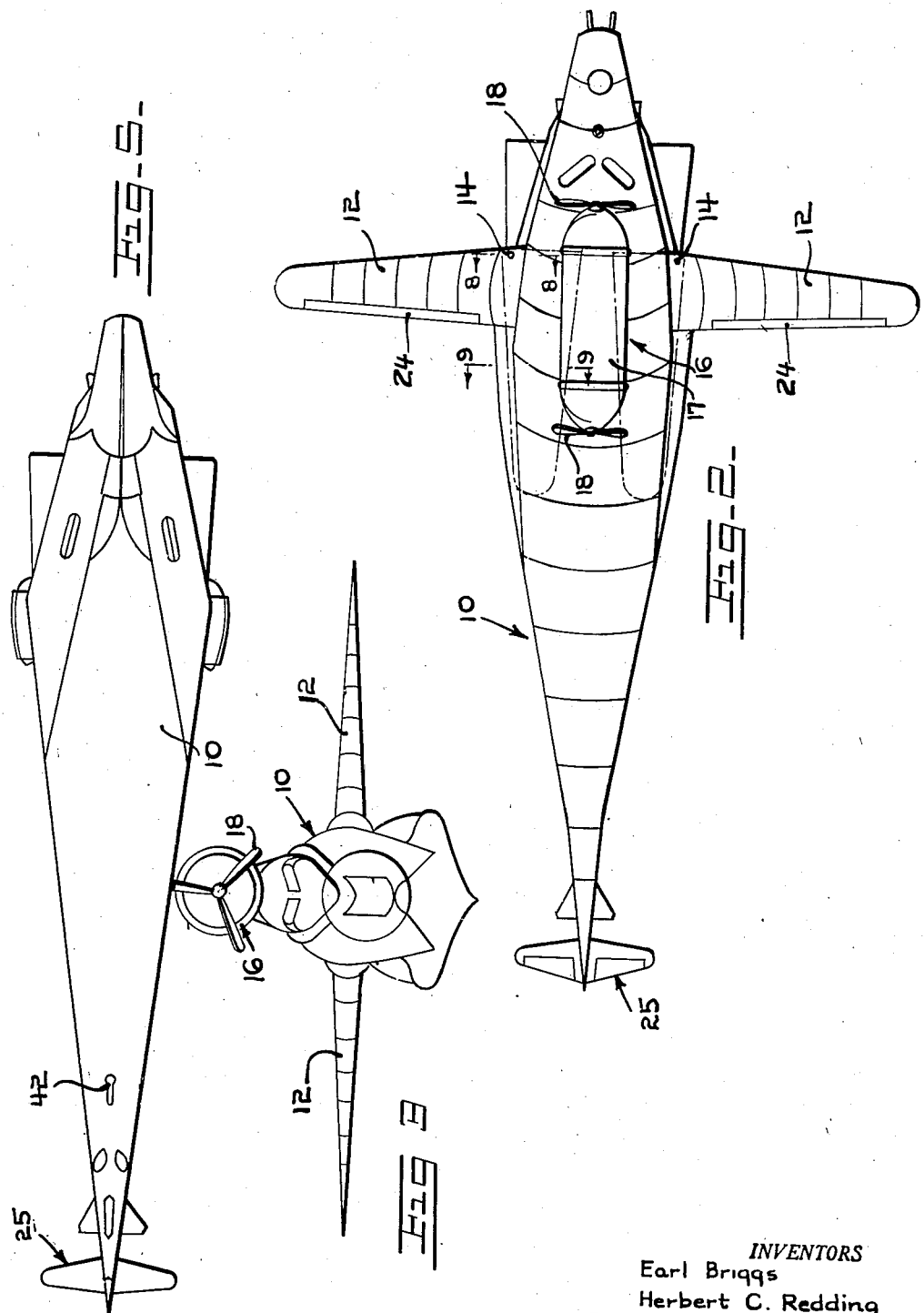

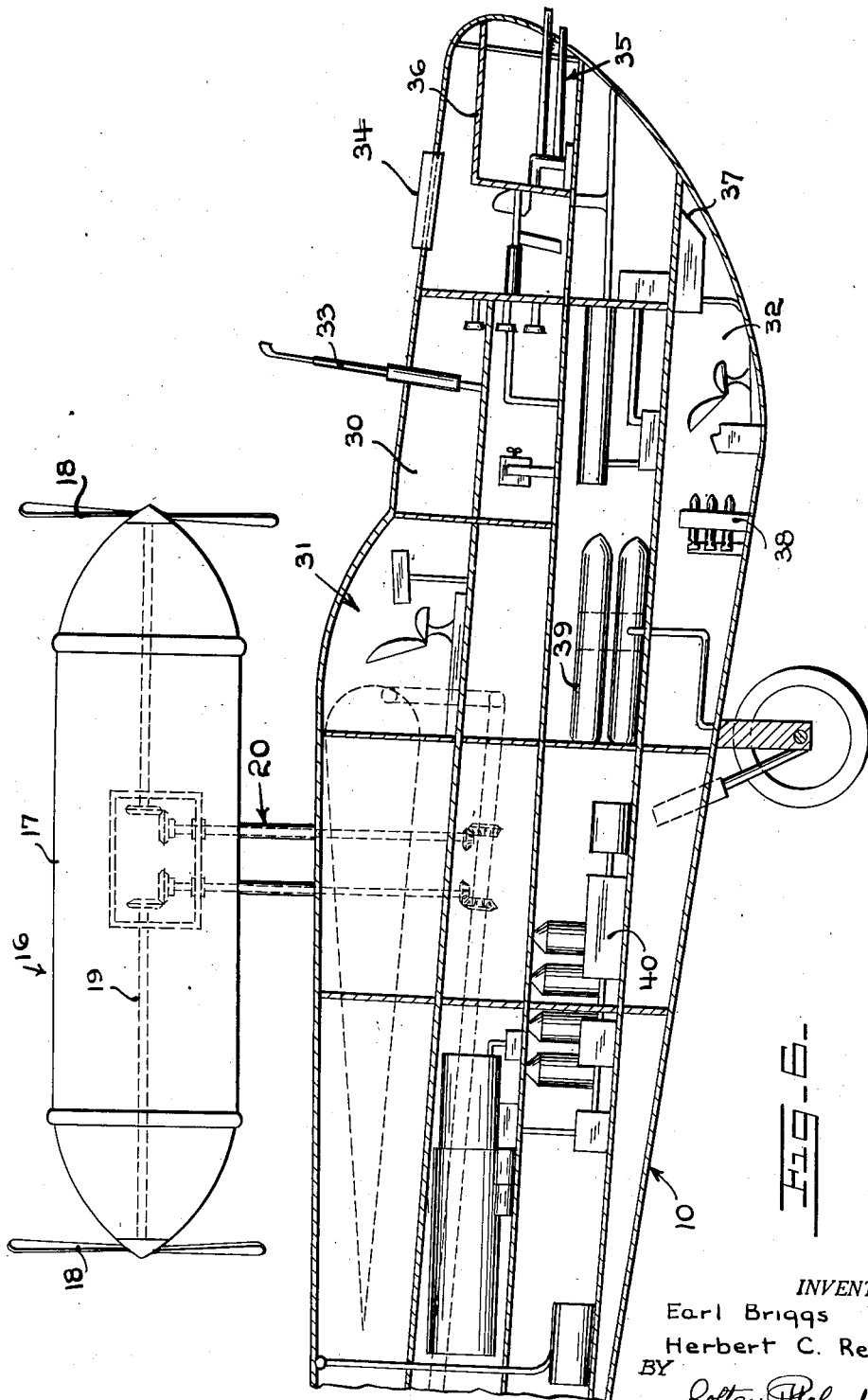

June 29, 1948.　　　　E. BRIGGS ET AL　　　　2,444,332
WING FOLDING ARRANGEMENT FOR SUBMERSIBLE AIRCRAFT
Filed Dec. 7, 1944　　　　　　　　　　　　　　5 Sheets-Sheet 4
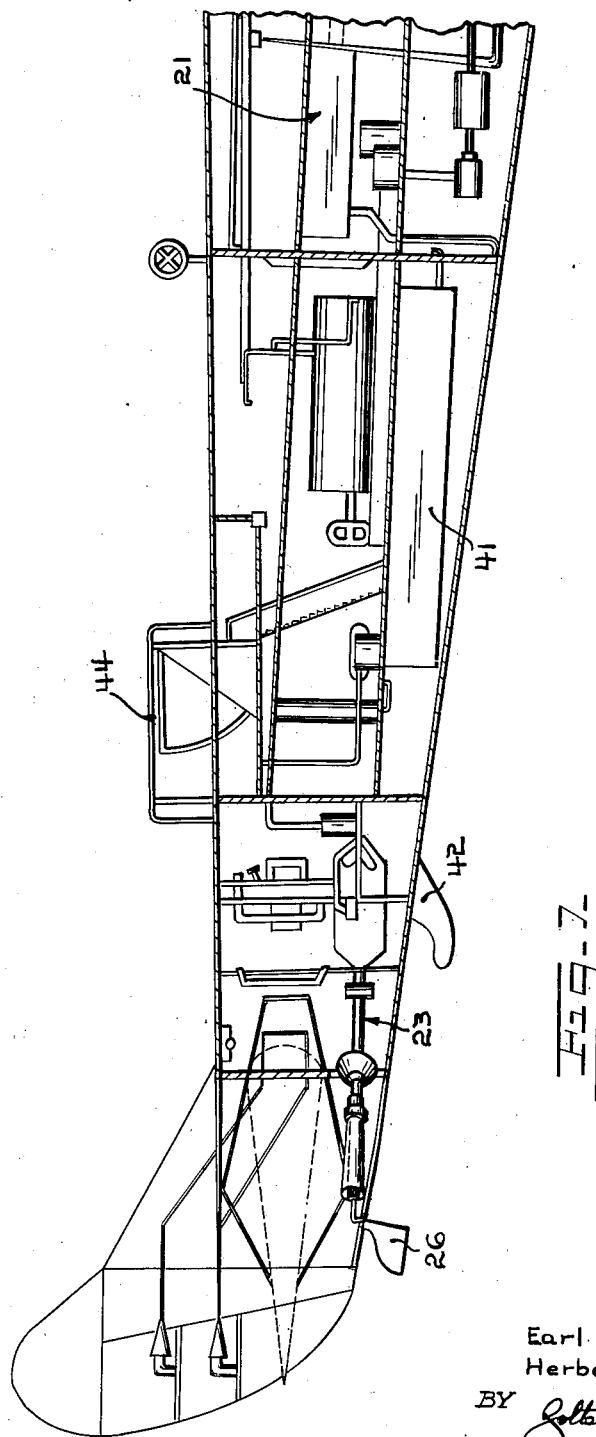
INVENTORS.
Earl Briggs
Herbert C. Redding
BY
ATTORNEY.

June 29, 1948. E. BRIGGS ET AL 2,444,332
WING FOLDING ARRANGEMENT FOR SUBMERSIBLE AIRCRAFT
Filed Dec. 7, 1944 5 Sheets-Sheet 5
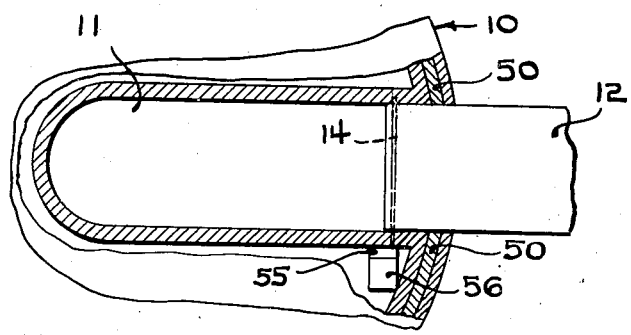
Fig-8-
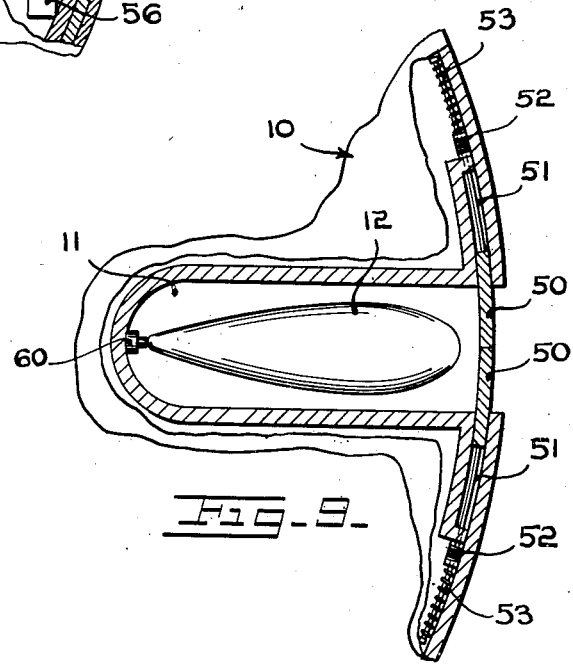
Fig-9-
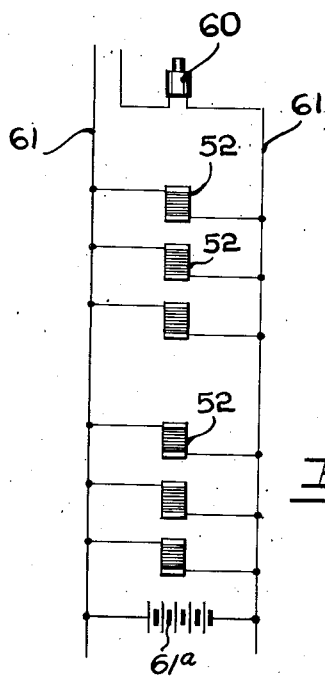
Fig-10-
INVENTORS
Earl Briggs
Herbert C. Redding
BY
ATTORNEY.

Patented June 29, 1948

2,444,332

UNITED STATES PATENT OFFICE 2,444,332

WING FOLDING ARRANGEMENT FOR SUBMERSIBLE AIRCRAFT

Earl Briggs and Herbert C. Redding, New York, N. Y.

Application December 7, 1944, Serial No. 567,068

3 Claims. (Cl. 244—49)

This invention relates to new and useful improvements in a submersible aircraft.

More particularly, the invention proposes a new and improved submersible aircraft which may travel in the air, on the surface of water as well as beneath the water surface.

It is proposed to characterize the new and improved submersible aircraft by the fact that it is provided with wings which are extended for flight in the air and which are folded into the sides of the fuselage-like body of the vessel when traveling on the surface of water, or beneath the water surface.

The invention proposes a novel overhead power drive with propellers for aerial flight. For traveling on, or under water, a marine drive is proposed.

The invention contemplates the use of an internal combustion engine for supplying power while traveling in the air and on the surface of water.

The invention also contemplates providing the fuselage-like body of the submersible aircraft with numerous chambers and compartments for housing various apparatus and other objects usually used in airplanes and submarines.

It is proposed to provide a submersive navigator's chamber, an aerial pilot control chamber, as well as chambers and compartments for gunners, and other personnel.

Still further the invention proposes a novel arrangement by which the side wings are extended and retracted and housed within the fuselage-like body.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a submersible aircraft as it appears during flight.

Fig. 2 is a plan view of Fig. 1.

Fig. 3 is a front elevational view of Fig. 1.

Fig. 4 is a side elevational view of the submersible aircraft as it would appear when submerged.

Fig. 5 is a bottom view of Fig. 4.

Fig. 6 is a fragmentary enlarged longitudinal sectional view through the front portion of the submersible aircraft.

Fig. 7 is a fragmentary enlarged longitudinal sectional view through the rear portion of the submersible aircraft.

Fig. 8 is a fragmentary enlarged vertical sectional view taken on the line 8—8 of Fig. 2.

Fig. 9 is a fragmentary enlarged vertical sectional view taken on the line 9—9 of Fig. 2.

Fig. 10 is a schematic wiring diagram of the mechanism from one side of the craft used to open and close the doors illustrated in Figs. 8 and 9.

The submersible aircraft, in accordance with this invention includes a fuselage-like body 10 having slit-like chambers 11 in its sides for receiving foldable side wings 12. The side wings 12 are pivotally mounted upon vertical pintles 14 so that they may pivot from the full position shown in Fig. 2 to the dash line positions. The pintles 14 are connected with mechanism for pivoting the wings 12 preferably electric motor driven drives as hereinafter described.

An overhead propeller drive 16 is mounted upon the top of the fuselage 10. This drive includes a cylindrical body 17 extending longitudinally of the fuselage-like body 10 and provided with propellers 18 at the front and the back. These propellers are driven by a shaft 19 connected by a suitable transmission 20 with an internal combustion motor 21 mounted within the fuselage.

The propelling means for driving the craft on water includes a marine drive and a suitable transmission mechanism 23 for connection with the motor 21.

The wings 12 are provided with the usual ailerons 24. The fuselage-like body 10 is provided with a tail 25 having the usual rudders and elevators and a marine rudder 26. The body 10 is also provided with a submersive navigator's chamber 30, an aerial pilot's chamber 31 and a gunner's chamber 32. A periscope 33 projects from the navigator's chamber 30. The top of the body 10 is provided with an escape hatch 34. Guns 35 are mounted in the front of body 10. It is contemplated that these guns will be slidably mounted so that they can be retracted into the body. These guns are mounted on extendible and retractable gun slides 36. The craft has the usual torpedo tubes 37. There is a bomb rack 38. Torpedoes 39 are mounted within the body. An air pump 40 and ballast tanks are also provided. Large gas tanks 41 serve to store the fuel needed. The fuselage-like body 10 is also provided with a tail skid 42. The back of the body has the usual tail gunner's turret guns 44.

The chambers 11 for the side wings 12 are provided with sliding doors 50. Each chamber has a top door 50 and a bottom door 50 which move towards each other for closing the chamber. These doors 50 are connected by rods 51 with solenoids 52 for closing said doors. Springs 53 are also connected with the rods 51 for opening said doors. The springs 53 resiliently urge said doors into open positions. When the solenoids 52 are energized the doors 50 will be closed. Each pintle 14 is connected with a gear speed reduction unit 55 which in turn is connected with an electric motor 56 by which the side wings 12 are moved from their open to their folded positions, and back again.

A push button switch 60 is mounted within each chamber 11. Each push button switch 60 is connected in a circuit 61 for controlling the solenoids 52 of the doors 50 of said chambers 11. The solenoids 52 are connected in parallel in the circuit 61.

The operation of the submersible aircraft is as follows:

When the side wings are extended the submersible aircraft may be used in aerial flight. It is operated in the usual way that an airplane is operated. For riding on the water, or submerging, the submersible aircraft is operated just like a submarine. The side wings 12 are folded into the compartments 11 so as not to interfere with water operation. The electric motors 56 may be energized to pivot the wings 12. When the wings 12 reach positions completely within the side compartments 11 they engage the push button switches 60, as schematically illustrated in Fig. 9 closing the circuit 61 which controls the solenoids 52, which in turn close the doors 50. The doors 50 remain closed as long as the side wings 12 engage the switches 60. When it is desired to extend the side wings the motors 56 are operated to pivot the side wings 12 outwards. As soon as they move away from the push button switches 60, the circuits 61 will be opened and the solenoids 62 will be deenergized and the springs 53 will open the door 50, which permits the side wings 12 to pass out from the chambers 11. A battery 61a is provided for supplying current to the circuits 61.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. In a submersible aircraft, a fuselage-like body having slit-like chambers in its sides for receiving foldable side wings, side wings pivotally mounted on said body for folding into said chambers, means for pivoting said side wings, doors for closing said chambers, push button switches within said chambers adapted to be pushed by said wings when said wings are folded into said chambers and to be released when said wings are moved out of said chambers, solenoids controlled by said push button switches, said solenoids being energized when said push buttons are pushed by said wings to close said doors and when said push buttons are released, said solenoids being deenergized to release said doors, springs for urging said doors open, and electric circuits including said switches and solenoids in parallel, and a battery for supplying current to said circuits.

2. In a submersible aircraft, a fuselage-like body having slit-like chambers in its sides for receiving foldable side wings, side wings pivotally mounted on said body for folding into said chambers, means for pivoting said side wings, doors for closing said chambers, push button switches within said chambers adapted to be pushed by said wings when said wings are folded into said chambers and to be released when said wings are moved out of said chambers, solenoids controlled by said push button switches, said solenoids being energized when said push buttons are pushed by said wings to close said doors and when said push buttons are released, said solenoids being deenergized to release said doors, springs for urging said doors open, and electric circuits including said switches and solenoids in parallel, and a battery for supplying current to said circuits, said means for pivoting said wings including pintles for pivotally supporting said wings, and electric motor driven means for turning said pintles.

3. In a submersible aircraft, a fuselage-like body having slit-like chambers in its sides for receiving foldable side wings, said wings pivotally mounted on said body for folding into said chambers, means for pivoting said side wings, doors for closing said chambers, push button switches within said chambers adapted to be pushed by said wings when said wings are folded into said chambers and to be released when said wings are moved out of said chambers, solenoids controlled by said push button switches, said solenoids being energized when said push buttons are pushed by said wings to close said doors and when said push buttons are released, said solenoids being deenergized to release said doors; springs for urging said doors open, and electric circuits including said switches and solenoids in parallel, and a battery for supplying current to said circuits, said means for pivoting said wings including pintles for pivotally supporting said wings, and electric motor driven means for turning said pintles, said doors being slide doors working across the front ends of said chambers.

EARL BRIGGS.
HERBERT C. REDDING.

REFERENCES CITED

The following references are of record in the file of this patent:

UNITED STATES PATENTS

| Number | Name | Date |
|---|---|---|
| 1,286,679 | Longobardi | Dec. 3, 1918 |
| 1,288,860 | Ferrari et al. | Dec. 24, 1918 |
| 1,622,191 | Filippi | Mar. 22, 1927 |
| 1,760,644 | Hall | May 27, 1930 |
| 2,001,620 | Levy | May 14, 1935 |

FOREIGN PATENTS

| Number | Country | Date |
|---|---|---|
| 816,813 | France | May 10, 1937 |